United States Patent
Sugahara et al.

(10) Patent No.: US 8,823,335 B2
(45) Date of Patent: Sep. 2, 2014

(54) SWITCHING POWER SUPPLY APPARATUS

(75) Inventors: Takeki Sugahara, Niiza (JP); Masao Ueno, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 260 days.

(21) Appl. No.: 13/269,703

(22) Filed: Oct. 10, 2011

(65) Prior Publication Data

US 2012/0092910 A1    Apr. 19, 2012

(30) Foreign Application Priority Data

Oct. 14, 2010    (JP) ................................. 2010-231526

(51) Int. Cl.
*G05F 5/00*    (2006.01)

(52) U.S. Cl.
USPC ........................................................ 323/207

(58) Field of Classification Search
USPC ............ 363/84, 86, 88–90, 125–127, 44, 48, 363/81; 323/207, 223, 266, 268, 269, 323/271–275, 282–285, 300, 303, 350, 351
See application file for complete search history.

(56) References Cited

U.S. PATENT DOCUMENTS

| | | | |
|---|---|---|---|
| 5,999,849 A * | 12/1999 | Gord et al. | 607/2 |
| 2007/0058402 A1* | 3/2007 | Shekhawat et al. | 363/89 |
| 2007/0279955 A1* | 12/2007 | Liu et al. | 363/125 |

FOREIGN PATENT DOCUMENTS

| | | |
|---|---|---|
| JP | 7-115774 | 5/1995 |
| JP | 2001-045763 | 2/2001 |
| JP | 2002-017087 | 1/2002 |
| JP | 2010-073621 | 4/2010 |
| JP | 2010-206941 | 9/2010 |

OTHER PUBLICATIONS

Japanese Office Action mailed Jun. 24, 2014 in Japanese Application No. 2010-231526 (with English translation), 7 pages.

* cited by examiner

*Primary Examiner* — Timothy J Dole
*Assistant Examiner* — Carlos Rivera-Perez
(74) *Attorney, Agent, or Firm* — Oblon, Spivak, McClelland, Maier & Neustadt, L.L.P.

(57) ABSTRACT

A switching power supply is provided to supply an AC input voltage. The supply includes a control circuit configured to detect a voltage of the AC power source in a voltage waveform, and switch elements in a synchronous rectification switching mode in synchronization with polarities of the voltage waveform when the AC input voltage is equal to or greater than a predetermined voltage value. The control unit also operates the switching without synchronization with the polarities when the AC input voltage is smaller than the predetermined voltage value.

3 Claims, 8 Drawing Sheets

FIG. 6

| OPERATING MODE | AC INPUT VOLTAGE POLARITY DETERMINATION SIGNAL | | GATE SIGNAL | SWITCHING GATE SIGNAL | |
|---|---|---|---|---|---|
| | VSin1(+SIDE) | VSin2(-SIDE) | VinA | Drv1 | Drv2 |
| ASYNCHRONOUS RECTIFICATION SWITCHING MODE | L | L | L | L | L |
| | L | L | H | H | H |
| ASYNCHRONOUS RECTIFICATION ON-STATE FIXING MODE | L | L | H | H | H |
| | L | L | L | L | H |
| SYNCHRONOUS RECTIFICATION SWITCHING MODE | H | L | H | H | H |
| | H | L | L | H | H |
| | L | H | L | H | L |
| | L | H | H | H | H | ved in Japanese Patent Application Publication No. Hei
SWITCHING POWER SUPPLY APPARATUS

TECHNICAL FIELD

The present invention relates to a switching power supply apparatus.

BACKGROUND ART

In a conventional switching power supply apparatus described in Japanese Patent Application Publication No. Hei 7-115774, two rectifying elements of a bridge-type full-wave rectifying circuit situated on a side where a feedback current flows are replaced with switching elements 104a and 104b, respectively, as shown in FIG. 1. This switching power supply apparatus is called bridgeless PFC, and its power factor, conversion efficiency, and reliability are improved by allowing a control circuit 106 to control the switching elements 104a and 104b appropriately.

Moreover, as shown in FIG. 2, the switching power supply apparatus distinguishes the upper half (positive voltage) and the lower half (negative voltage) of the wave of an AC input voltage, and causes the switching elements 104a and 104b to operate in synchronization with the upper and lower halves of the wave, respectively. In this case, in each of the switching elements 104a and 104b, a switching mode period and an ON-state fixing mode (synchronous rectification mode) period are switched in accordance with the polarities of the AC input voltage.

By the above configuration, the switching power supply apparatus described in Japanese Patent Application Publication No. Hei 7-115774 can improve its power factor, efficiency, and reliability.

However, in the conventional switching power supply apparatus, the operations of the switching elements 104a and 104b are unstable, making it impossible to achieve a sufficient improvement in power factor in particular.

SUMMARY OF INVENTION

The present invention provides a switching power supply apparatus which has a bridgeless PFC (power factor correction) circuit configuration and whose power factor is improved.

A first aspect of the invention is a switching power supply apparatus comprising: an AC power source configured to supply an AC input voltage; a first PFC unit including a first reactor having one end connected to one end of the AC power source, a first series circuit including a first switching element and a second switching element connected in series between the other end of the first reactor and the other end of the AC power source, a second series circuit including a first rectifying element and a capacitor connected in series to both ends of the first switching element, respectively, and a third series circuit including a second rectifying element and the capacitor connected in series to both ends of the second switching element, respectively; and a control circuit configured to detect a voltage of the AC power source in a voltage waveform, and make the first and second switching elements perform switching in a synchronous rectification switching mode in synchronization with polarities of the voltage waveform when the AC input voltage is equal to or greater than a predetermined voltage value, and make the first and second switching elements operate without synchronization with the polarities when the AC input voltage is smaller than the predetermined voltage value.

BRIEF DESCRIPTION OF DRAWINGS

FIG. 6 is a diagram showing a table of truth values of a decoder in an asynchronous rectification switching mode and a synchronous rectification switching mode in the switching power supply apparatus illustrated in FIG. 4.

DESCRIPTION OF EMBODIMENTS

Figure 1:
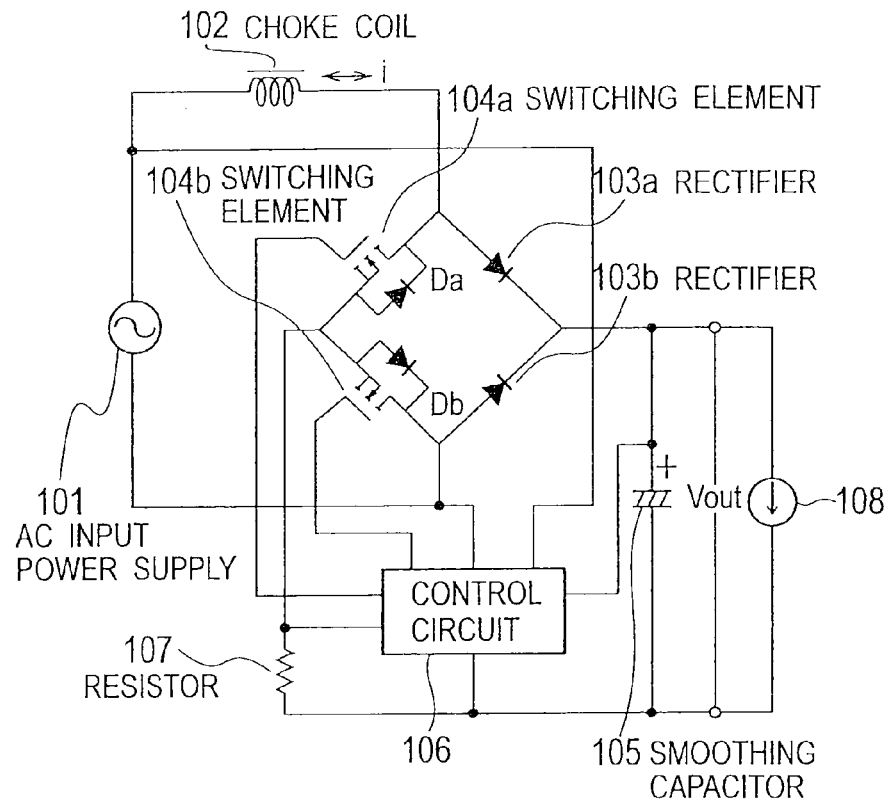
FIG. 1 is a configuration diagram of a conventional switching power supply apparatus.
Figure 2:
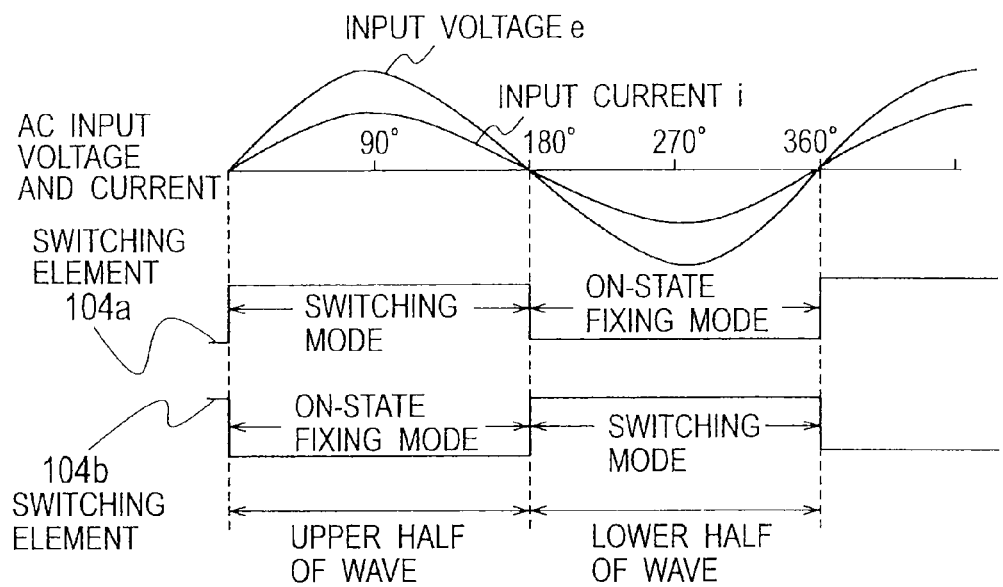
FIG. 2 is a waveform chart showing an AC input voltage and the operation modes of each switching element in the power supply shown in FIG. 1.

Hereinbelow, switching power supplies of embodiments of the present invention will be described in detail by referring to the drawings.

(Embodiment 1)

Figure 3:
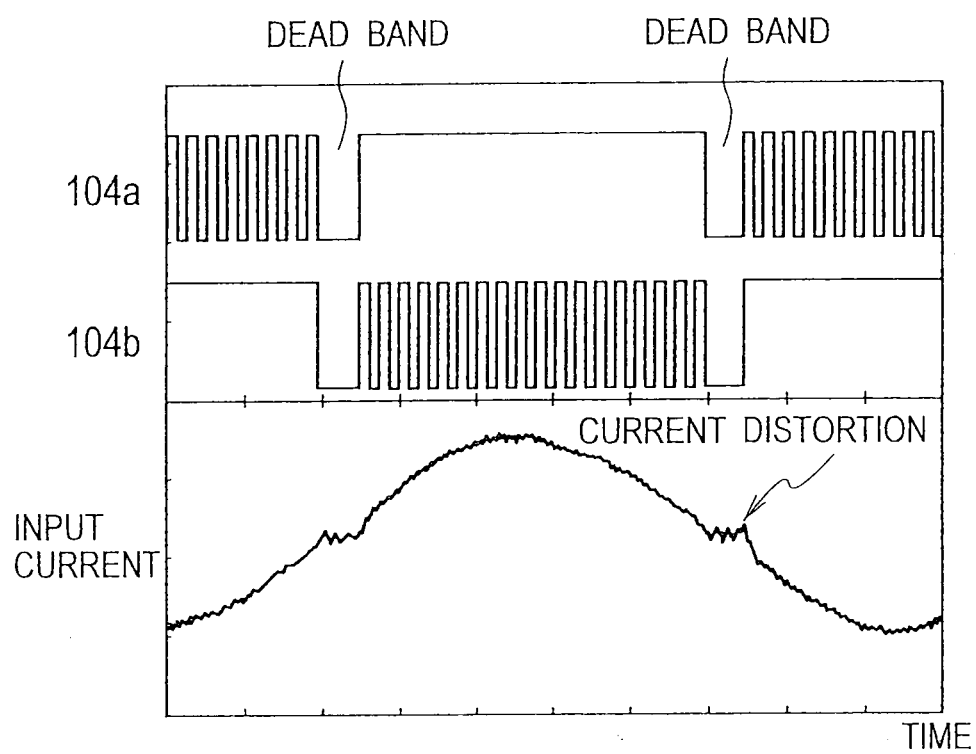
FIG. 3 is a diagram showing the switching operation of the conventional switching power supply apparatus and a corresponding input current waveform.

First of all, the present inventors studied the cause of being unable to improve the power factor in the conventional switching power supply apparatus. Waveforms illustrated in FIG. 3 show the switching waveforms of the switching elements 104a and 104h and a corresponding input current waveform as the operation waveforms of the conventional switching power supply apparatus described in Japanese Patent Application Publication No. Hei 7-115774. Distortions are present in the input current waveform. It is found that when the distortions appear, the switching elements 104a and 104b arc both in their OFF states and are not in a desired synchronous rectification mode.

If the switching elements 104a and 104b are to operate in synchronization with the upper and lower halves (polarities) of the wave of an AC input voltage, it is necessary to distinguish the upper and lower halves of the wave. Specifically, comparators and a reference voltage need to be used to distinguish the polarities for the upper and lower halves of the wave. However, the input voltage value does not reach either of the reference voltage values in regions where the AC input voltage is near a zero cross. Consequently, a dead band within which no response is given from either of the comparators is generated around timings at which the upper and lower halves of the wave are switched from one another.

Stopping switching operations in this dead band causes the input current to flow through body diodes Da and Db of the switching elements 104a and 104b, hence increasing the conduction loss as compared to when the switching operations are performed. As a result, the above-mentioned distortions (cross-over distortions) are generated in the input current waveform, lowering the power factor.

To solve this problem, it is possible to employ a method in which the reference voltage values are lowered to raise the sensitivities of the comparators, for example. However, this method increases the likelihood of noise-related erroneous operations of the comparators, which in turn renders the switching elements' operations unstable, and therefore deteriorates the reliability.

A switching power supply apparatus of Embodiment 1 is characterized in that its switching elements perform switching in an asynchronous rectification switching mode when both upper and lower halves of the wave of the input voltage are in a dead band. Here, the asynchronous rectification switching mode means that a switching element performs switching without synchronization with the positive or negative polarity of the upper or lower half of the wave of the AC input voltage. Note that a synchronous rectification switching mode means that a switching element performs switching in synchronization with the positive or negative polarity of the upper or lower half of the wave of the AC input voltage.

Figure 4:
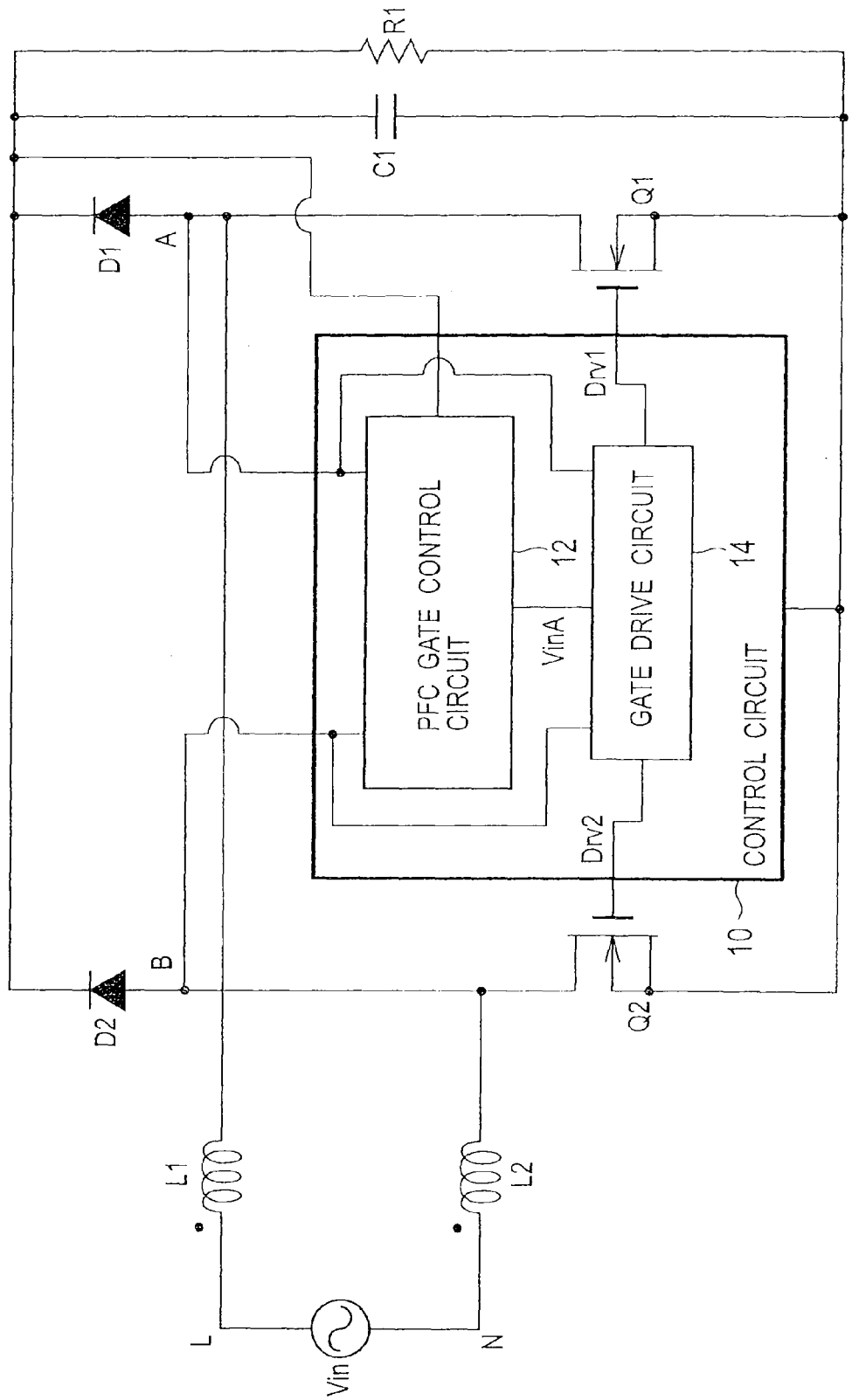
FIG. 4 is a configuration diagram of a switching power supply apparatus according to Embodiment 1 of the present invention.

FIG. 4 is a configuration diagram of the switching power supply apparatus according to Embodiment 1 of the present invention. The switching power supply apparatus illustrated in FIG. 4 is formed of a single-mode (single-phase) bridgeless PFC circuit. This PFC circuit is constituted of: an AC power source Vin; boost reactors L1 and L2; switching elements Q1 and Q2 each formed of a MOSFET; diodes D1 and D2; a capacitor C1; and a control circuit 10. A load R1 is connected to both ends of the capacitor C1. Incidentally, only one of the boost reactors L1 and L2 may be included.

One end of the AC power source Vin is connected to the anode of the diode D1 and the drain of the switching element Q1 through the boost reactor L1. The other end of the AC power source Vin is connected to the anode of the diode D2 and the drain of the switching element Q2 through the boost reactor L2.

The cathode of the diode D1 and the cathode of the diode D2 are connected to one end of the capacitor C1 and one end of the load R1. The source of the switching element Q1 and the source of the switching element Q2 are connected to the other end of the capacitor C1 and the other end of the load R1.

The control circuit 10 is configured to make the switching elements Q1 and Q2 perform switching in the synchronous rectification switching mode when the AC input voltage is equal to or greater than a predetermined voltage value, and in the asynchronous rectification switching mode when the AC input voltage is smaller than the predetermined voltage value, i.e., when both the upper and lower halves of the wave of the input voltage are in a dead band. The control circuit 10 includes a PFC gate control circuit 12 and a gate drive circuit 14.

The PFC gate control circuit 12 is connected to the anodes of the diodes D1 and D2 and the one end of the capacitor C1, and configured to generate a gate signal VinA based on the voltage of the capacitor C1. The gate drive circuit 14 is connected to the anodes of the diodes D1 and D2, the gates of the switching elements Q1 and Q2, and the PFC gate control circuit 12, and configured to generate switching element gate signals Drv1 and Drv2 for driving the switching elements Q1 and Q2 and to output the switching element gate signals Drv1 and Drv2 to the gates of the switching elements Q1 and Q2, respectively. The switching element gate signals Drv1 and Drv2 are generated based on signals from the anodes of the diodes D1 and D2 for determining the polarity of the AC input voltage (hereinafter, referred to as AC input voltage polarity determination signals) and the gate signal from the PFC gate control circuit 12.

Note that the PFC gate control circuit 12 may be configured to generate the gate signal VinA based on the drain currents of the switching elements Q1 and Q2 by using a current transformer or a shunt resistor or based on the above-mentioned voltage and current.

Figure 5:
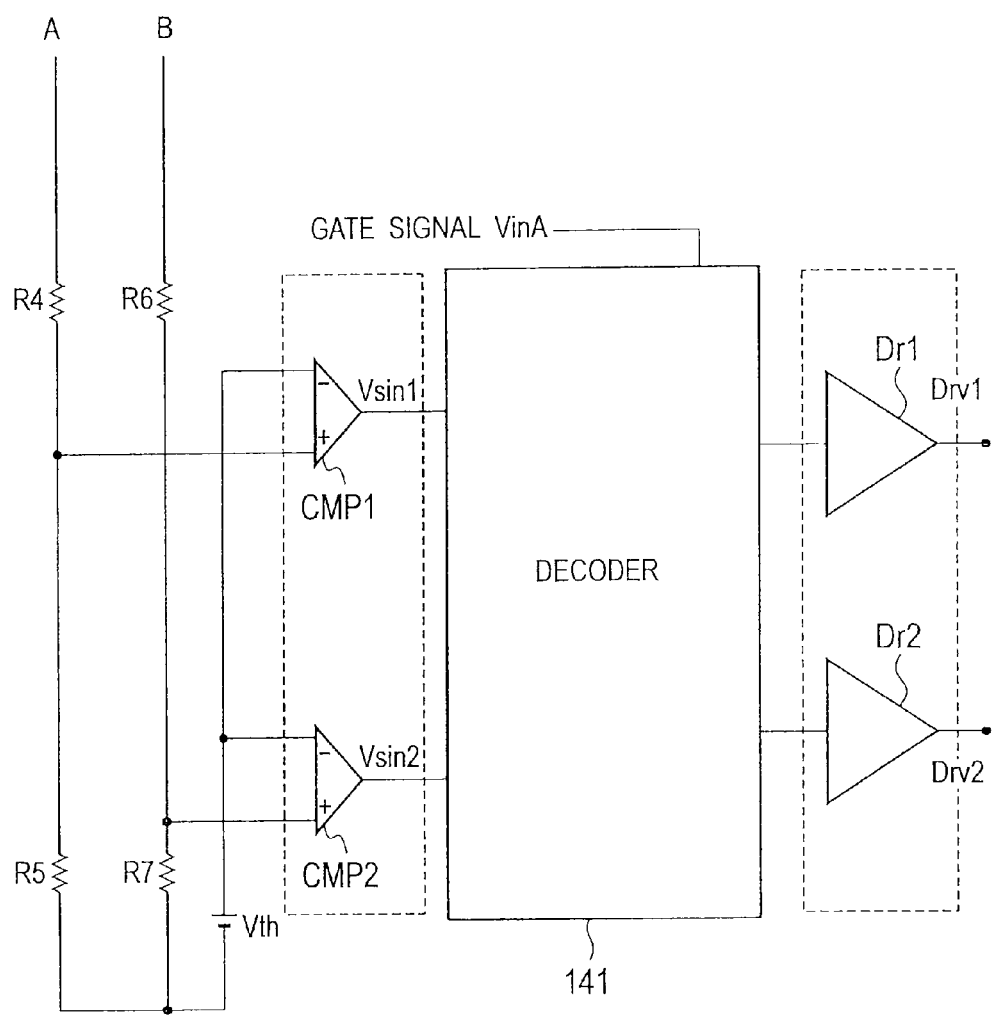
FIG. 5 is a configuration diagram illustrating a gate drive circuit provided to the switching power supply apparatus illustrated in FIG. 4.

FIG. 5 is a configuration diagram illustrating a gate drive circuit provided to the switching power supply apparatus illustrated in FIG. 4. The gate drive circuit illustrated in FIG. 5 has comparators CMP1 and CMP2, a decoder 141, drivers Dr1 and Dr2, and a reference voltage Vth. Note that the reference voltage may be provided independent of each comparator.

The comparator CMP1 is configured to: output an output Vsin1 at a L level when a divided voltage (a voltage obtained by dividing the voltage of the anode of the diode D1 (a voltage at a node A) by resistors R4 and R5) applied to the non-inverting input terminal is smaller than the reference voltage Vth applied to the inverting input terminal; and output the output Vsin1 at a H level when the divided voltage is equal to or greater than the reference voltage Vth.

The comparator CMP2 is configured to: output an output Vsin2 at a L level when a divided voltage (a voltage obtained by dividing the voltage of the anode of the diode D2 (a voltage at a node B) by resistors R6 and R7) applied to the non-inverting input terminal is smaller than the reference voltage Vth applied to the inverting input terminal; and output the output Vsin2 at a H level when the divided voltage is equal to or greater than the reference voltage Vth.

The decoder 141 is configured to generate the switching element gate signals Drv1 and Drv2 based on the outputs Vsin1 and Vsin2 from the comparators CMP1 and CMP2 and the gate signal VinA from the PFC gate control circuit 12, and output the switching element gate signals Drv1 and Drv2 to the switching elements Q1 and Q2 through the drivers Dr1 and Dr2, respectively.

FIG. 6 is a diagram showing a table of truth values of the decoder 141 in the asynchronous rectification switching mode and the synchronous rectification switching mode in the switching power supply apparatus illustrated in FIG. 4. FIG. 6 assumes that the mode is the synchronous rectification switching mode in a normal time and the asynchronous rectification switching mode in a dead band, and shows the levels of the AC input voltage polarity determination signals Vsin1 and Vsin2, the gate signal VinA from the PFC gate control circuit 12, and the switching element gate signals Drv1 and Drv2 in each of the synchronous and asynchronous rectification switching modes. The switching elements Q1 and Q2 are ON when the switching element gate signals Drv1 and Drv2 are at the H level, respectively.

Figure 7:
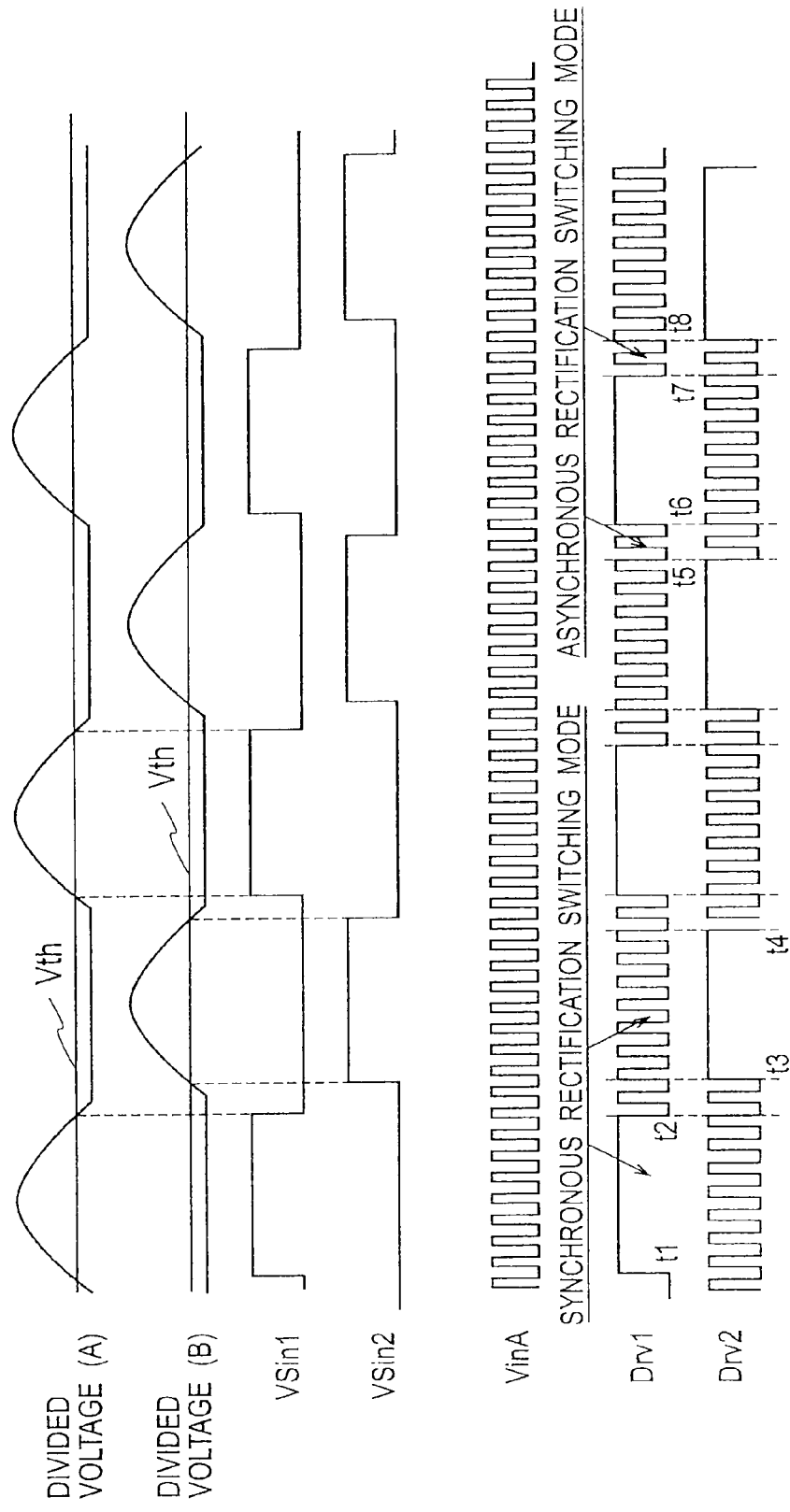
FIG. 7 is a waveform chart showing the operations of components in the asynchronous rectification switching mode and the synchronous rectification switching mode in the switching power supply apparatus illustrated in FIG. 4.

Next, the operations of the PFC circuit will be described by referring to FIGS. 6 and 7. The description will be given firstly of the operations of the switching elements Q1 and Q2 when the AC input voltage is equal to or greater than a predetermined voltage value, i.e., in a normal time (outside a dead band) during which the aforementioned divided voltage is equal to or greater than the reference voltage Vth, which is for example a time t1 to t2 and a time t3 to t4.

During the time t1 to t2, the positive side (node A side) of the AC input voltage is equal to or greater than the predetermined voltage value, and therefore the output Vsin1 of the comparator CMP1 is at the H level. On the other hand, the negative side (node B side) of the AC input voltage is smaller than the predetermined voltage value, and therefore the output Vsin2 of the comparator CMP2 is at the L level.

In this event, as shown in FIG. 6, the decoder 141 sets the switching element gate signal Drv2 to the H level irrespective of the level of the gate signal VinA, but sets the switching element gate signal Drv1 to the same level as the gate signal VinA, which is the L level (or the H level).

During the time t3 to t4, the negative side (node B side) of the AC input voltage is equal to or greater than the predetermined voltage value, and therefore the output Vsin2 of the comparator CMP2 is at the H level. On the other hand, the positive side (node A side) of the AC input voltage is smaller than the predetermined voltage value, and therefore the output Vsin1 of the comparator CMP1 is at the L level.

In this event, as shown in FIG. 6, the decoder 141 sets the switching element gate signal Drv1 to the H level irrespective of the level of the gate signal VinA, but sets the switching element gate signal Drv2 to the same level as the gate signal VinA, which is the L level (or the H level).

In this way, the switching elements Q1 and Q2 can perform switching in the synchronous rectification switching mode during a normal time.

The description will be given next of the operations of the switching elements Q1 and Q2 in the asynchronous rectification switching mode (inside a dead hand) during which the AC input voltage is smaller than the predetermined voltage value, which is for example a time t5 to t6 and a time t7 to t8.

During the time t5 to t6 and the time t7 to t8, the positive side (node A side) and the negative side (node B side) of the AC input voltage are smaller than the predetermined voltage value, and therefore the output Vsin1 of the comparator CMP1 and the output Vsin2 of the comparator CMP2 are both at the L level.

In this event, as shown in FIG. 6, the decoder 141 sets both of the switching element gate signals Drv1 and Drv2 to the L level if the gate signal VinA is at the L level, and to the H level if the gate signal VinA is at the H level.

Figure 8:
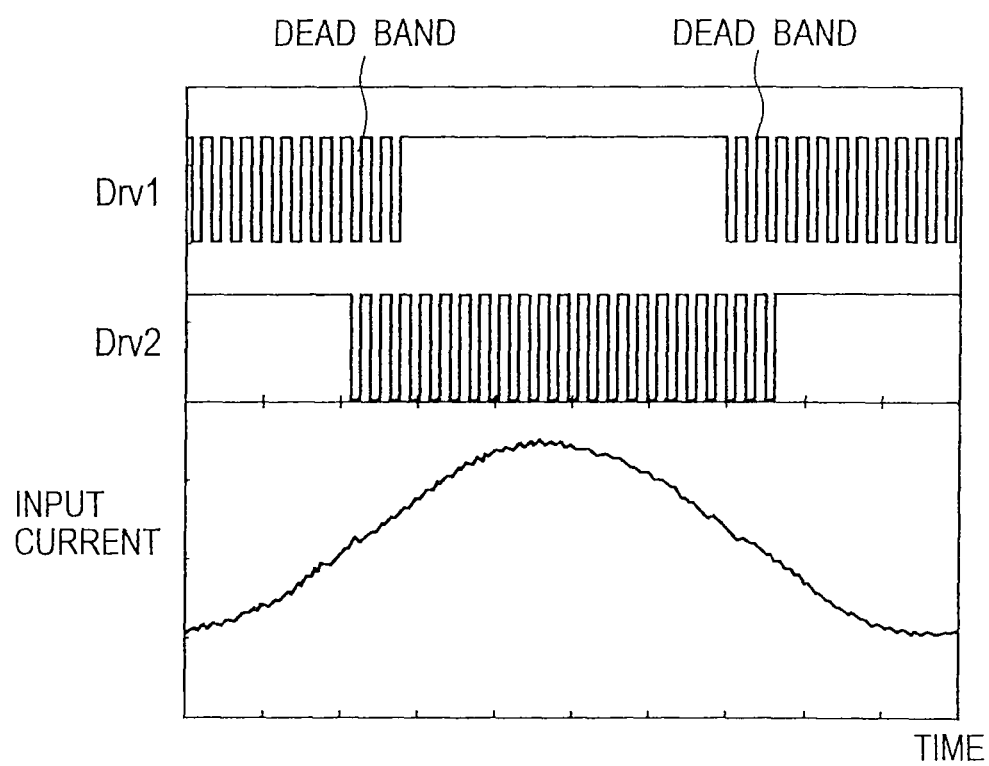
FIG. 8 is a diagram showing the switching operation of the switching power supply apparatus of Embodiment 1 and a corresponding input current waveform.

FIG. 8 is a diagram showing the switching operation of the switching power supply apparatus of Embodiment 1 and a corresponding input current waveform.

As described above, when both the upper and lower halves of the wave of the input voltage are in a dead band, the switching elements Q1 and Q2 perform switching in the asynchronous rectification switching mode in which the switching elements Q1 and Q2 ignore the polarity of the input voltage and follow the gate signal VinA that is based on the voltage of the capacitor C1. Continuing the operations of the switching elements Q1 and Q2 reduces the conduction loss. This in turn prevents distortions in the input current waveform as shown in FIG. 8 and thus improves the power factor. Moreover, the reduction in conduction loss prevents unstable operations of the switching elements Q1 and Q2 and thus improves the reliability of the switching power supply apparatus.

In Embodiment 1, the switching elements Q1 and Q2 perform switching in the asynchronous rectification switching mode when both the upper and lower halves of the wave of the input voltage are in a dead band. However, when both the upper and lower halves of the wave of the input voltage are in a dead band (Vsin1 and Vsin2 are both at the L level), the switching elements Q1 and Q2 may be for example kept in the ON state by using an asynchronous rectification ON-state fixing mode in which, as shown in FIG. 6, the decoder 141 sets both of the switching element gate signals Drv1 and Drv2 to the H level irrespective of the level of the gate signal VinA from the PFC gate control circuit 12, for example.

Specifically, in a dead band, the input current is so small that the on-duty cycle of the gate signal increases up to nearly 100%, which is equivalent to the ON state. Accordingly, the operations of the switching elements Q1 and Q2 are not stopped, reducing the conduction loss. Thus, the power factor is improved. Moreover, the drive loss occurring due to the switching operations of the switching elements Q1 and Q2 is reduced.

(Embodiment 2)

Figure 9:
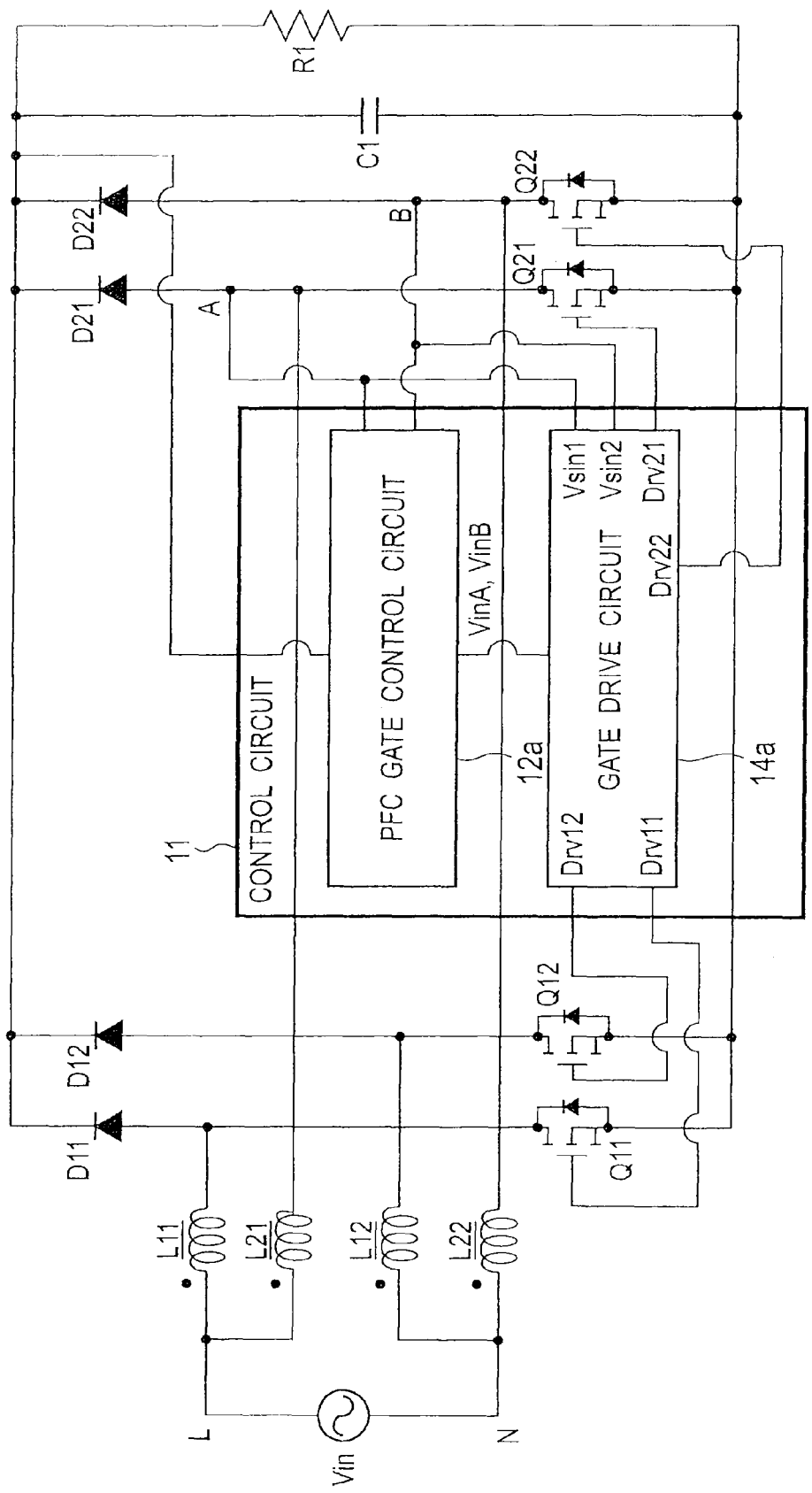
FIG. 9 is a configuration diagram of a switching power supply apparatus according to Embodiment 2 of the present invention.

FIG. 9 is a configuration diagram of the switching power supply apparatus according to Embodiment 2 of the present invention. The switching power supply apparatus illustrated in FIG. 9 is formed of an interleaving-mode (multi-phase) bridgeless PFC circuit. This PFC circuit is constituted of: an AC power source Vin; boost reactors L11, L12, L21 and L22; switching elements Q11, Q12, Q21 and Q22 each formed of a MOSFET; diodes D11, D12, D21 and D22; a capacitor C1; and a control circuit 11. A load R1 is connected to both ends of the capacitor C1.

Incidentally, only one of the boost reactors L11 and L21 may be included, and only one of the boost reactors L12 and L22 may be included.

One end of the AC power source Vin is connected to the anode of the diode D11 (D21) and the drain of the switching element Q11 (Q21) through the boost reactor L11 (L21). The other end of the AC power source Vin is connected to the anode of the diode D12 (D22) and the drain of the switching element Q12 (Q22) through the boost reactor L12 (L22).

The cathode of the diode D11 (D21) and the cathode of the diode D12 (D22) are connected to one end of the capacitor C1 and one end of the load R1. The source of the switching element Q11 (Q21) and the source of the switching element Q12 (Q22) are connected to the other end of the capacitor C1 and the other end of the load R1.

The reactors L11 and L12, the switching elements Q11 and Q12, the diodes D11 and D12, and the capacitor C1 constitute a first PFC unit. The reactors L21 and L22, the switching elements Q21 and Q22, the diodes D21 and D22, and the capacitor C1 constitute a second PFC unit.

The control circuit 11 is configured to turn the first and second PFC units on and off alternately by 180°, and make the switching elements Q11 (Q21) and Q12 (Q22) perform switching in the synchronous rectification switching mode when the AC input voltage is equal to or greater than a predetermined voltage value, and in the asynchronous rectification switching mode when the AC input voltage is smaller than the predetermined voltage value, i.e., when both the upper and lower halves of the wave of the input voltage are in a dead band. The control circuit 11 includes a PFC gate control circuit 12a and a gate drive circuit 14a.

The PFC gate control circuit 12a is connected to the anodes of the diodes D21 and D22 and the one end of the capacitor C1, and configured to generate a gate signal VinA and a gate signal VinB which are different in phase from each other by 180° based on the voltage of the capacitor C1.

The gate drive circuit 14a is connected to the anodes of the diodes D21 and D22, the gates of the switching elements Q11 (Q21) and Q12 (Q22), and the PFC gate control circuit 12a, and configured to generate switching element gate signals respectively in an A phase) (0°) and in a B phase (180°) for driving the switching elements Q11 (Q21) and Q12 (Q22) and to output the switching element gate signals to the gates of the switching elements Q11 (Q21) and Q12 (Q22), respectively. The switching element gate signals are generated based on signals from the anodes of the diodes D21 and D22 for determining the polarity of the AC input voltage (hereinafter, referred to as AC input voltage polarity determination signals) and the two gate signals VinA and VinB from the PFC gate control circuit 12a.

Note that the table of truth values of the decoder shown in FIG. 6 is of a case where the switching element gate signals are in the A phase (0°) of the interleaving mode. However, the switching element gate signals in the B phase (180°) of the interleaving mode are exactly the same as the switching element gate signals in the A phase (0°).

Accordingly, in the interleaving-mode PFC circuit of Embodiment 2, operations same as the operation of the single-mode PFC circuit of Embodiment 1 are performed alternately by 180°, and the same effect is achieved. Note that in the interleaving-mode PFC circuit, the switching elements Q11, Q12, Q21, and Q22 may be likewise kept in the ON state by using the asynchronous rectification ON-state fixing mode.

It should be noted that the present invention is not limited to the switching power supplies of Embodiments 1 and 2. For example, the switching elements do not necessarily have to perform the same operation in a dead band; the switching operation and the ON-state fixing operation can be combined. Moreover, the switching power supply apparatus of the present invention can be applied to a switching power supply apparatus of any of a continuous current mode (CCM), a discontinuous current mode, and a critical current mode (CRM).

The present invention can also be applied to an n-phase (n≥2) interleaving-mode PFC circuit in which each phase operates with a phase difference of 360°/n. Moreover, the control circuit may be configured to detect the AC input voltage polarity determination signals directly from both ends of the AC power source, respectively.

According to the present invention, the first and second switching elements perform switching in the asynchronous rectification switching mode when both the upper and lower halves of the wave of the input voltage are in a dead hand. Thus, it is possible to improve the power factor of a switching power supply apparatus having a bridgeless PFC (power factor correction) circuit configuration.

The present invention is applicable to switching power supplies such as a single-mode or interleaving-mode PFC circuit and an AC-DC converter.

What is claimed is:

1. A switching power supply apparatus comprising:
an AC power source configured to supply an AC input voltage;
a first PFC unit including
a first reactor having one end connected to one end of the AC power source,
a first series circuit including a first switching element and a second switching element connected in series between the other end of the first reactor and the other end of the AC power source,
a second series circuit including a first rectifying element and a capacitor connected in series to both ends of the first switching element, respectively, and
a third series circuit including a second rectifying element and the capacitor connected in series to both ends of the second switching element, respectively; and
a control circuit configured to detect a voltage of the AC power source in a voltage waveform, and make the first and second switching elements perform switching in a synchronous rectification switching mode in synchronization with polarities of the voltage waveform when the AC input voltage is equal to or greater than a predetermined voltage value, and make the first and second switching elements simultaneously turn on and simultaneously turn off without synchronization with the polarities when the AC input voltage is smaller than the predetermined voltage value.

2. The switching power supply apparatus according to claim 1, wherein the control circuit at least makes the first and second switching elements perform an ON operation when the AC input voltage is smaller than the predetermined voltage value.

3. The switching power supply apparatus according to claim 1, further comprising at least one second PFC unit connected in parallel to the first PFC unit between the AC power source and the capacitor and having the same configuration as the first PFC unit, wherein
the first PFC unit and the second PFC unit operate with a predetermined phase difference.

* * * * *